(12) United States Patent
Escott et al.

(10) Patent No.: US 7,571,104 B2
(45) Date of Patent: Aug. 4, 2009

(54) DYNAMIC REAL-TIME CROSS-FADING OF VOICE PROMPTS

(75) Inventors: Alex Escott, Vancouver (CA); Norrie K. Taylor, Vancouver (CA)

(73) Assignee: QNX Software Systems (Wavemakers), Inc., Vancouver, British Columbia ( * ) Notice: Subject to any disclaimer, the term of this patent is extended or adjusted under 35 U.S.C. 154(b) by 519 days.

(21) Appl. No.: 11/139,028

(22) Filed: May 26, 2005

(65) Prior Publication Data
US 2006/0271372 A1 Nov. 30, 2006

(51) Int. Cl.
G10L 21/00 (2006.01)
G10L 13/08 (2006.01)
G10L 15/18 (2006.01)

(52) U.S. Cl. .................. 704/278; 704/258; 704/267; 704/270

(58) Field of Classification Search .............. 704/258, 704/267, 270, 278
See application file for complete search history.

(56) References Cited

U.S. PATENT DOCUMENTS

| | | | |
|---|---|---|---|
| 5,517,672 A | * | 5/1996 | Reussner et al. .......... 710/52 |
| 5,842,172 A | | 11/1998 | Wilson |
| 5,918,213 A | * | 6/1999 | Bernard et al. .......... 705/26 |
| 6,889,193 B2 | * | 5/2005 | McLean ................ 704/500 |
| 2002/0133357 A1 | | 9/2002 | McLean |
| 2003/0009336 A1 | * | 1/2003 | Kenmochi et al. ........ 704/258 |

FOREIGN PATENT DOCUMENTS

| EP | 1 347 440 A2 | 9/2003 |
|---|---|---|
| JP | 2001-110138 | 4/2001 |

OTHER PUBLICATIONS

Patent Cooperation Treaty International Preliminary Report on Patentability from International Application No. PCT/CA2006/000843—Dated Nov. 29, 2007.
International Search Report from International Application No. PCT/CA2006/000843—Dated Sep. 12, 2006.

* cited by examiner

Primary Examiner—Richemond Dorvil
Assistant Examiner—Eric Yen
(74) Attorney, Agent, or Firm—Brinks Hofer Gilson & Lione (57) ABSTRACT

A system and method are provided for creating shorter more natural sounding voice messages and prompts from a plurality of pre-recorded sound segments, the prerecorded sound segments are dynamically cross faded in order to produce a more natural blended sound, various cross fade parameters such as the fade length and the shape of the cross fade amplitude envelopes are determined based on characteristics of the various sound segments being combined.

19 Claims, 7 Drawing Sheets

DYNAMIC REAL-TIME CROSS-FADING OF VOICE PROMPTS

BACKGROUND OF THE INVENTION

1. Technical Field

The present invention relates to a system and method for generating voice messages from pre-recorded audio segments. Individual pre-recorded audio segments are dynamically cross-faded during playback of audio messages synthesized from a plurality of such audio segments. Dynamically cross fading the sound segments speeds up the playback time of the voice messages and provides more natural sounding voice messages.

2. Related Art

In many automated systems in which a human user must interact with a computer through an audio interface, the automated system communicates with the user via audible voice prompts. Such voice prompts are typically created by chaining together multiple pre-recorded audio segments. For example, an automated telephone information service communicates telephone numbers to a requester by sequentially playing audio files representing each digit of a telephone number. Similarly, most voice recognition systems require feedback to the user. Typically such feedback is in the form of audio voice prompts requesting certain actions or information from the user. The content of such voice prompts is often context specific, so the system must select the appropriate pre-recorded sound segments to join together "on the fly" from among multiple pre-recorded sound segments in order to create a message that delivers the desired information, or asks for the appropriate response from the user.

Typically, such voice messages are created by simply concatenating a plurality of individual audio files and sequentially playing them back over a loudspeaker. Often the individual sound files will have short silent lead-in and exit times on each side of the actual sound portion of the audio file. When multiple files are played back, these short silent portions result in a message that sounds choppy and unnatural and takes much longer to play back than would otherwise be the case if the message were spoken by a live person. Such a delay and unnatural delivery can be a source of frustration for users of systems that employ synthesized voice prompts. Often a user must wait for the entire message prompt to be played back before being allowed to proceed with the next step in an automated transaction. The undue delay from excessively long voice prompts can be tedious and annoying.

Figures 1, 2:
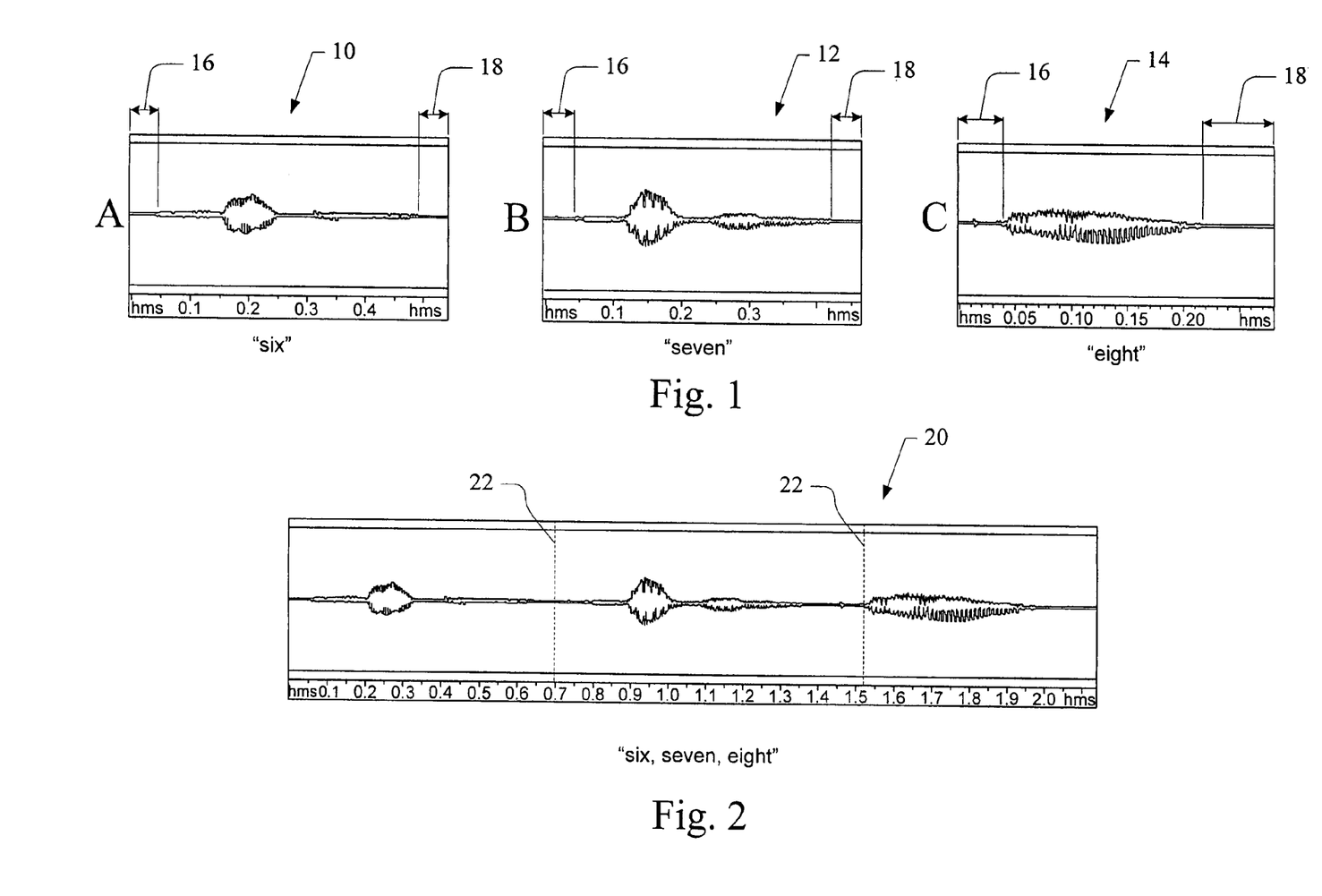
FIG. 1 shows oscilloscope traces of three separate pre-record sound segments representing the spoken words six, seven and eight.
FIG. 2 shows the pre-recorded sound segments six, seven and eight concatenated together.

FIG. 1 shows three typical pre-recorded sound files 10, 12, 14 representing the spoken words "six", "seven" and "eight" respectively. Each of the sound files 10, 12, 14 includes a lead in time 16, and an exit time 18 where no actual sound is produced. FIG. 2 shows the same files concatenated together to form the sequence "six-seven-eight". As can be seen, there are relatively long periods of silence 22 between the combined sound files. No information is provided to the user during these intervals. These delays unduly lengthen the playback time and detract from the sound quality of the resulting voice message.

Figure 3:
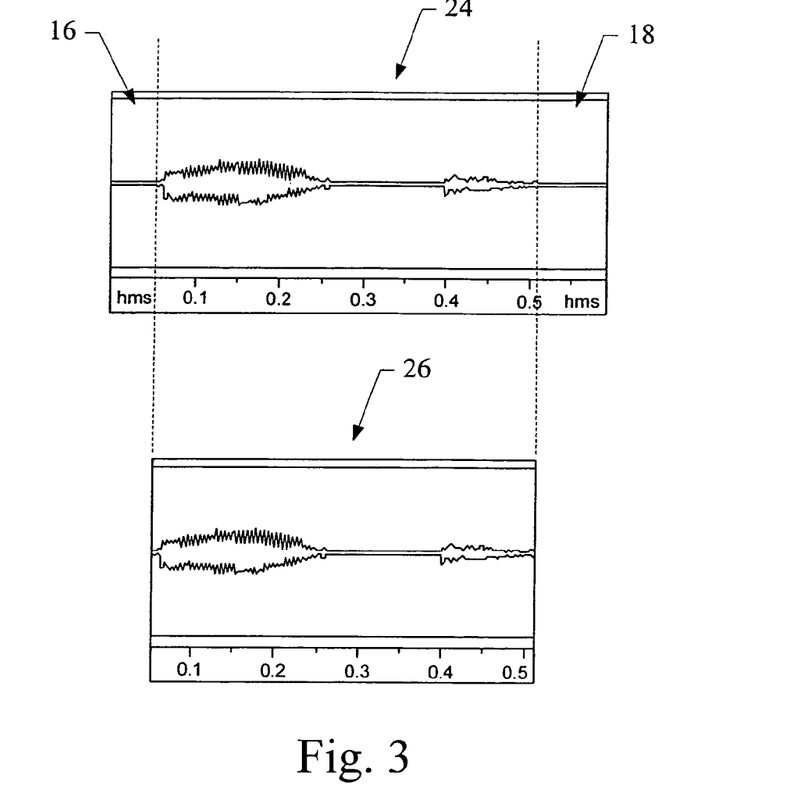
FIG. 3 shows a pre-recorded sound segment that is tightly clipped to remove all silent portions surrounding the actual sound of the sound segment.

FIG. 3 depicts a method of clipping audio files so that only those portions of the audio file in which sounds are actually voiced are included in synthesized voice messages. Unclipped sound segment 24 has silent lead in and exit portions 16, 18. In the clipped sound segment 26 the silent portions have been removed. As can be seen, the duration of the original unclipped file 24 is significantly longer than the clipped file 26. FIG. 4 again shows the numbers sequence "six-seven-eight" 28 but this time composed of sound segments that have been clipped in the manner shown in FIG. 3. Clipping the sound segments in this manner shortens the playback time of the three digit sequence from 2.12 seconds to 1.93 seconds. Although this represents a significant improvement over the unclipped sequence, the result is still longer and sounds choppier than when the sequence is spoken by a natural person. Thus, there remains a need for improved systems and methods for synthesizing voice messages and prompts from individual sound files. Such improved systems and methods must produce shorter more natural sounding voice messages and prompts.

SUMMARY

The present invention relates to improved systems and methods for sequentially combining pre-recorded sound segments to form synthesized voice communications. The invention improves upon previous sound file concatenation techniques by dynamically cross fading the various pre-recorded sound segments as the sound segments are reproduced. Cross fading the sequential sound segments gives the final voice communication a more blended natural sound than is otherwise the case, and reduces the length of time necessary to deliver the synthesized message.

According to the invention, sequentially combined sound files are blended together to form smooth natural sounding transitions from one sound segment to the next. The first sound segment is slowly faded out while the second sound segment is slowly faded in. The period of overlap while the first sound segment is fading out and the second sound segment is fading in is known as the cross fade time. The rates at which the first sound segment fades out and the second sound segment fades in are governed by cross fade amplitude envelopes which are applied to the trailing portion of the first sound segment and the leading portion of the second sound segment, respectively. The cross fade envelopes shape the fade in and fade-out characteristics of the first and second sound segments by conforming the amplitude of the respective sound segments to the shape of the respective cross fade envelopes.

The present invention achieves shorter message playback times and more natural sounding synthesized voice messages by manipulating the cross fade time and the shape of the cross fade amplitude envelopes according to spectral characteristics of the sound segments that are being combined. Thus, the amount of overlap between sound segments and the rates at which the first sound segment fades out and the second sound segment fades in are varied based on the nature of the adjacent of the sounds of the sound segments that are being combined.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

The present invention relates to a system and method for producing shorter more natural sounding voice messages and audio prompts. Voice messages tend to convey information to a user and voice prompts tend to elicit information or further action on the part of the user, however, both terms relate to audible communications produced for interacting with a user. For the purpose of the present description the two terms may be considered synonymous.

According to the invention, shorter more natural sounding voice messages are created by dynamically cross fading adjacent sound segments. Dynamic cross fading involves gradually fading out the leading sound segment while simultaneously fading in the trailing sound segment. The system and method of the present invention achieve positive results by manipulating various cross fade parameters based on the spectral characteristics of the various sound segments being combined. A brief introduction to the various cross fade parameters that are manipulated according to the invention will be followed by a description of the manner in which they may be manipulated to produce shorter more natural sounding voice messages and prompts.

There are three cross fade parameters that can be manipulated to alter the transition from a first, leading sound segment to a second, trailing sound segment. These are the cross fade time, the shape of the fade-out cross fade amplitude envelope applied to the trailing portion of a first sound segment and the shape of the fade-in cross fade amplitude envelope applied to the leading portion of a second sound segment. The cross fade time corresponds to the temporal overlap between the first sound segment and the second sound segment. Generally, the first sound segment will begin fading out at the same time the second sound segment begins fading in. The length of time between the time when the first sound segment begins fading out and the time the second sound segment has completely faded in corresponds to the cross fade time. The length of the cross fade envelopes will typically correspond with the total cross fade time.

Figure 5:
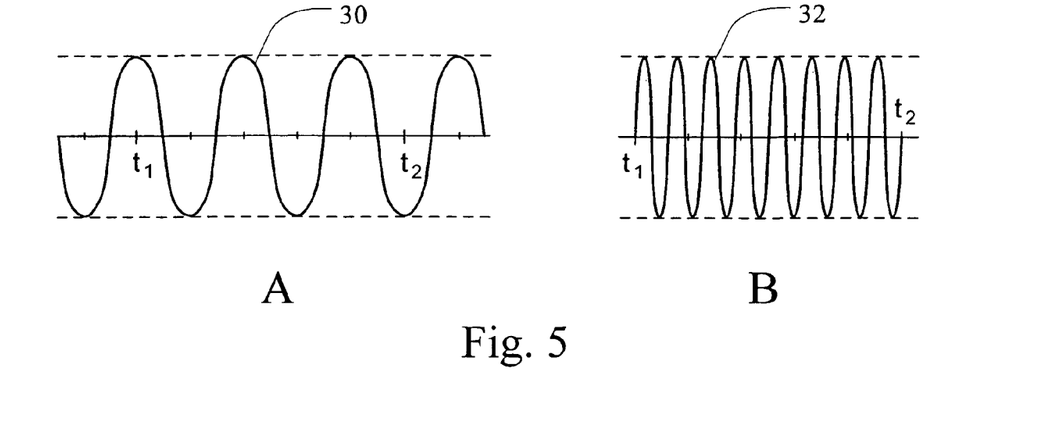
FIG. 5 shows an expanded view of the trailing end of a first pre-recorded sound segment and the leading end of a second pre-recorded sound segment.
Figure 6:
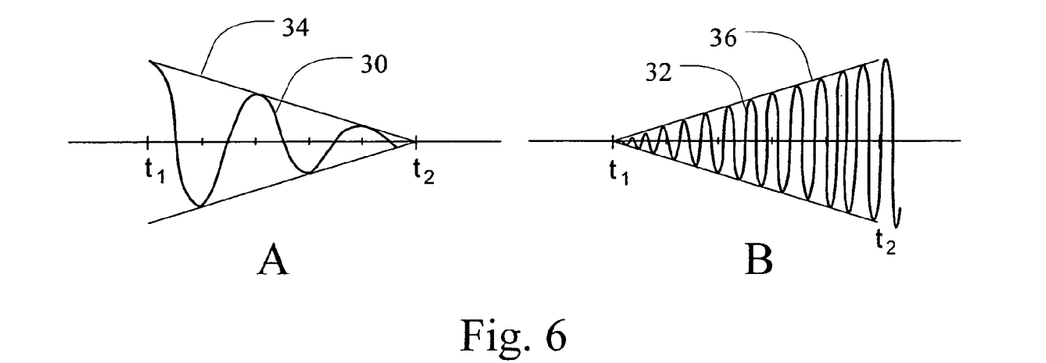
FIG. 6 shows cross fade amplitude envelopes applied to the first and second pre-recorded sound segments shown in FIG. 5.

The cross fade amplitude envelopes shape the amplitude of the sound segments to which they are applied. Effectively the cross fade amplitude envelopes control the rates at which the sound segments are faded in and faded out within the cross fade time. To illustrate the effect of the cross fade amplitude envelopes FIG. 5 shows the trailing portion of a hypothetical first sound segment 30 and the leading portion of a hypothetical second sound segment 32. As shown, both sound segments have substantially constant amplitudes over the period shown. FIG. 6 shows a linear fade-out cross fade amplitude envelope 34 applied to the first sound segment 30 and a linear fade-in cross fade amplitude envelope 36 applied to the second sound segment 32. As can be seen, the amplitude of the first sound segment 30 gradually decreases in a linear manner from its full un-attenuated amplitude at time $t_1$ until it is completely faded out at time $t_2$. Similarly, but in reverse, the second sound segment 32 gradually fades in a linear manner, starting at zero amplitude at time $t_1$ and reaching its full unattenuated amplitude at time $t_2$.

Figure 7:
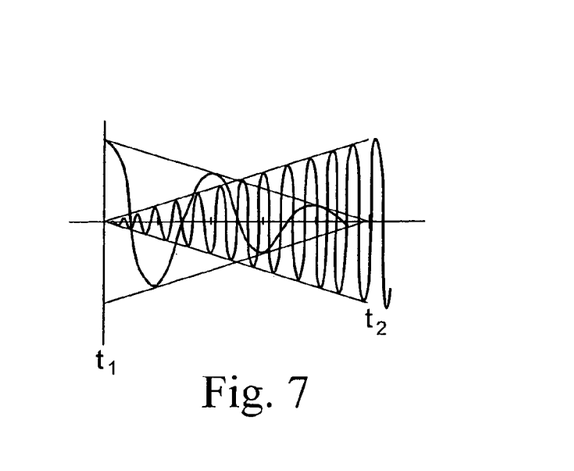
FIG. 7 shows the first and second pre-recorded sound segments of FIG. 6 cross faded together.

FIG. 7 shows the first sound segment 30 cross faded with the second sound segment 32, with the cross fade envelopes 34, 36 of FIG. 6 applied to the first and second sound segments respectively. The time between times $t_1$ and $t_2$ corresponds to the cross fade time. At $t_1$ the first sound segment begins fading out and the second sound segment begins fading in. At $t_2$ the first sound segment has completely faded to zero amplitude and the second sound segment has reached its full amplitude. The final cross-fade signal is the sum of the first sound segment 30 and the second sound segment 32 shown in FIG. 7.

Figure 8:
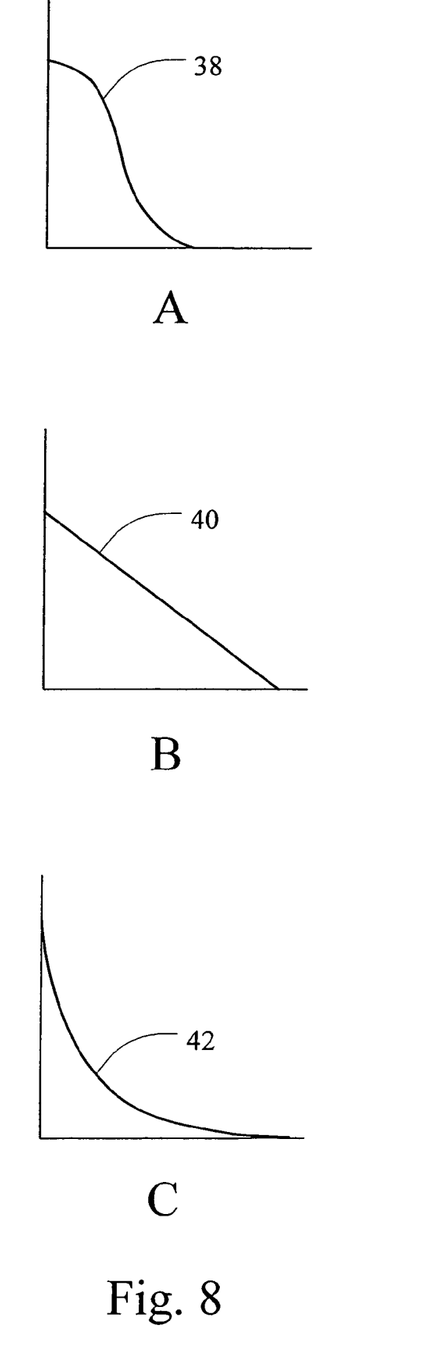
FIG. 8 shows various shaped fade-out cross fade amplitude envelopes.

The shape of the cross fade amplitude envelopes need not necessarily be linear. In fact, the cross fade amplitude envelopes can take on nearly any shape desired. FIG. 8 shows three examples of different shaped fade-out cross fade amplitude envelopes. FIG. 8A shows a generally sinusoidal shaped fade-out cross fade amplitude envelope 38. FIG. 8B shows a linear fade-out cross fade amplitude envelope 40 similar to that described above. FIG. 8C shows an exponential fade-out cross fade amplitude envelope 42. When the sinusoidal fade-out cross fade amplitude envelope 38 is applied to the trailing end of a sound segment, the sinusoidal shape of the fade-out cross fade amplitude envelope 38 causes the sound to fade slowly at first. The fade rate gradually increases in the middle of the fade length, then gradually diminishes again at the end of the fade length. When the linear fade-out cross fade amplitude envelope 40 is applied to the trailing end of a first sound segment, the sound will diminish at a constant rate throughout the fade length as has been described. Finally, when the decaying exponential fade-out cross fade amplitude envelope 42 is applied to the trailing end of a sound segment. The sound segment will diminish exponentially, dying away rapidly at the beginning of the fade length, and decaying at a slower and slower rate at the end of the fade length.

Figure 9:
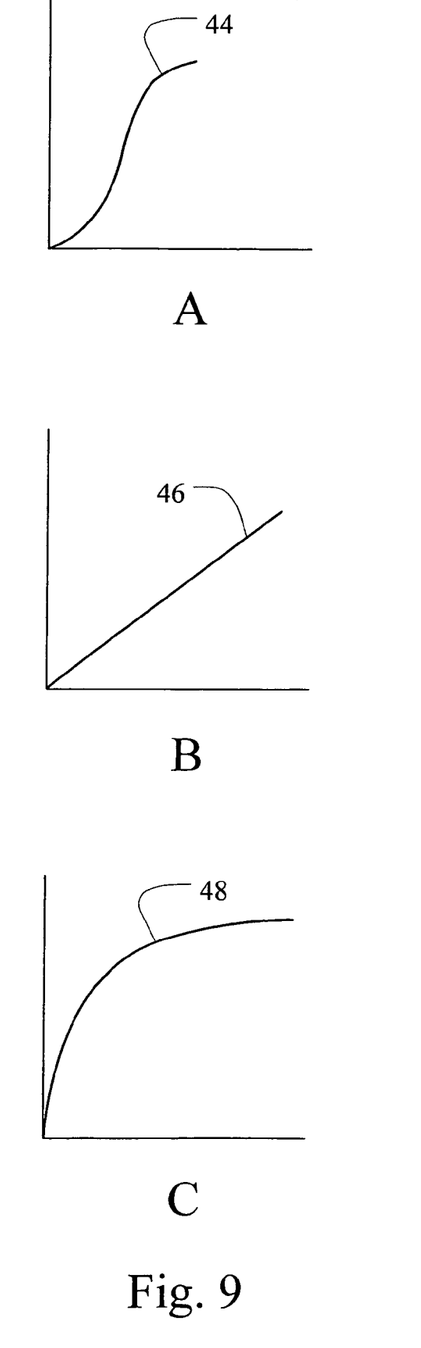
FIG. 9 shows various shaped fade-in cross fade amplitude envelopes.

FIG. 9 shows fade-in cross fade amplitude envelopes that are the compliments of the fade-out cross fade amplitude envelopes of FIG. 8. Thus, FIG. 9A shows a fade-in cross fade amplitude envelope 44 having a generally sinusoidal shape. FIG. 9B shows a linear fade-in cross fade amplitude envelope 46 and FIG. 6C shows a logarithmic fade-in cross fade amplitude envelope 48. When the sinusoidal fade-in cross fade amplitude envelope 44 is applied to the leading end of a sound segment, the amplitude of the sound signal increases slowly at the beginning of the fade length. Gradually the fade-in rate increases for a time during the middle of the fade length, then gradually diminishes again at the end of the fade length. When the linear fade-in cross fade amplitude envelope 46 is applied to the leading end of a sound segment, the linear fade-in cross fade amplitude envelope 46 causes the amplitude of the sound signal to grow at a constant steady rate throughout the fade length until the sound signal reaches its full amplitude at the end of the fade length. Finally, when logarithmic fade-in cross fade amplitude envelope 48 is applied to the leading end of a sound segment, the logarithmic shape of the fade-in cross fade amplitude envelope 48 causes the amplitude of the sound signal to increase at a very rapid rate at the beginning of the fade length, and gradually decreases the fade-in rate over the course of the fade length as the sound signal approaches full amplitude.

Figure 10:
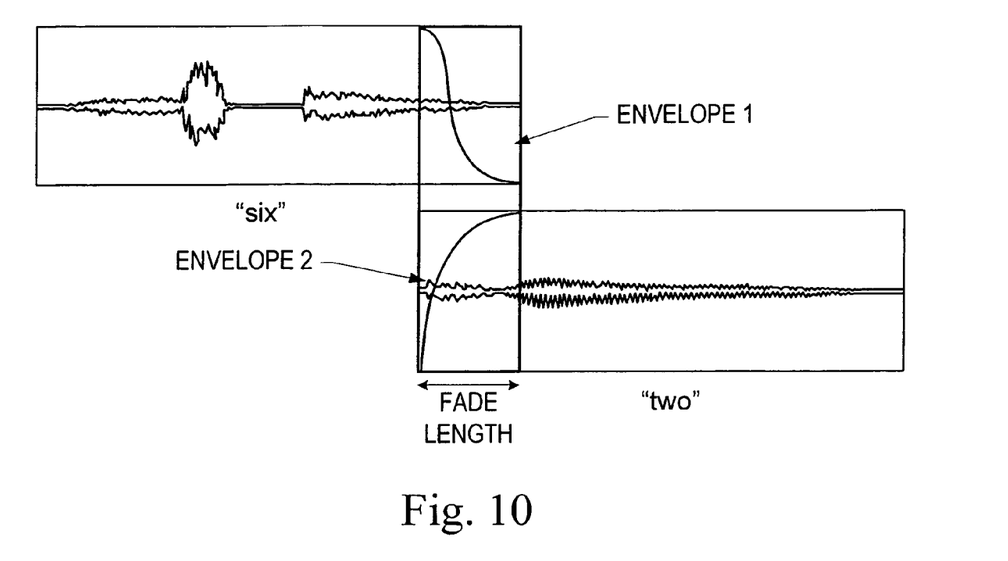
FIG. 10 shows an example of audio sound segments being dynamically cross faded having differently shaped fade-out and fade in cross fade amplitude envelopes.

While FIGS. 8 and 9 appear to show complimentary pairs of cross fade amplitude envelopes, the various complimentary shapes need not be applied together. Any combination of fade-out/fade-in cross fade amplitude envelopes may be employed. For example, FIG. 10 shows a first sound segment 50 and a second sound segment 52 that are to be dynamically cross faded according to the invention. The first sound segment 50 corresponds to the spoken word six and the second sound segment corresponds to the spoken word two. A sinusoidal fade-out cross fade amplitude envelope like that shown in FIG. 8A is to be applied to the first sound segment, and a logarithmic fade in cross fade amplitude envelope such as that shown in FIG. 9C is to be applied to the second sound segment 52. The horizontally overlapping shaded portion represents the cross fade time during which the two sound segments will be overlapped and the cross fade amplitude envelopes applied. It should be noted that the shapes of the cross fade amplitude envelopes need not be limited to the shapes shown in FIGS. 8 and 9. Substantially any shape envelope may be employed. The overriding factor in selecting envelope shapes will be how the various sound segments sound when cross faded together using the variously shaped cross-fade amplitude envelopes.

Figure 4:
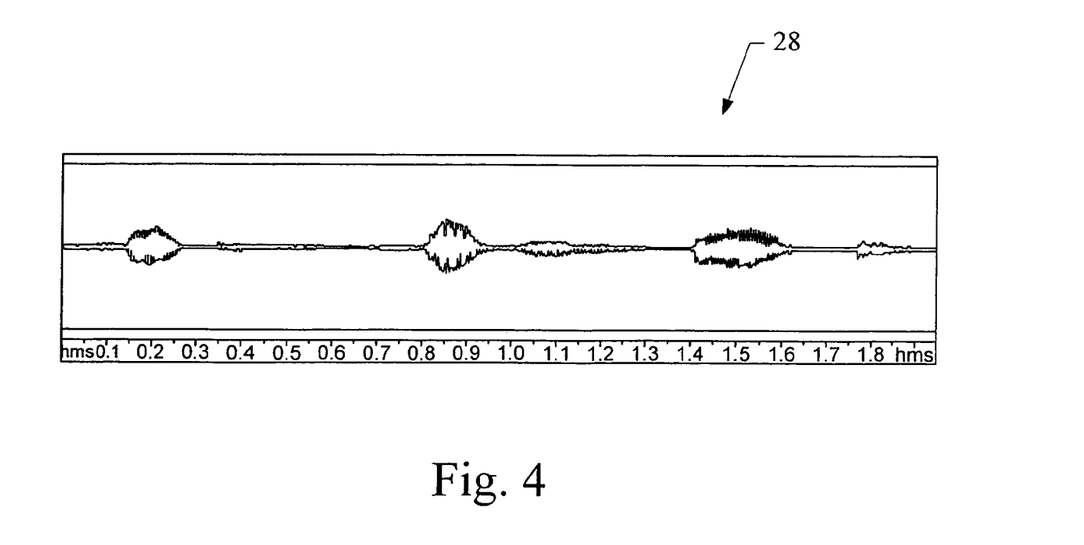
FIG. 4 shows clipped pre-recorded sound segments concatenated together.
Figure 11:
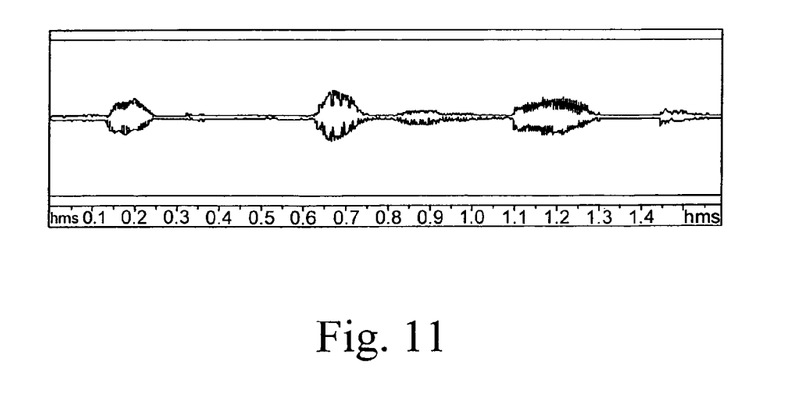
FIG. 11 shows various sound segments representing the words "six" "seven" "eight" dynamically cross faded according to the invention.

FIG. 11 shows the same sequence of pre-recorded sound segments "six", "seven" and "eight" as shown in FIGS. 2 and 4, but, dynamically cross faded according to the present invention. The cross faded sequence "six, seven, eight" took 1.58 seconds to be played. An improvement of 0.35 seconds over the clipped segment concatenation technique described earlier and shown in FIG. 4. This substantial time savings was realized over a sequence of just three numbers. The time savings more than doubles to approximately three quarters of a second over the course of a seven digit phone number and even more if an area code is included. It should also be noted that the dynamic cross fading of the present invention may be employed in systems in which synthesized voice messages may be far more complex than mere sequences of numbers. In such cases the time savings in voice messages synthesized form pre-recorded sound segments may be even greater, significantly reducing the burden on those who must listen to such messages.

Figure 12:
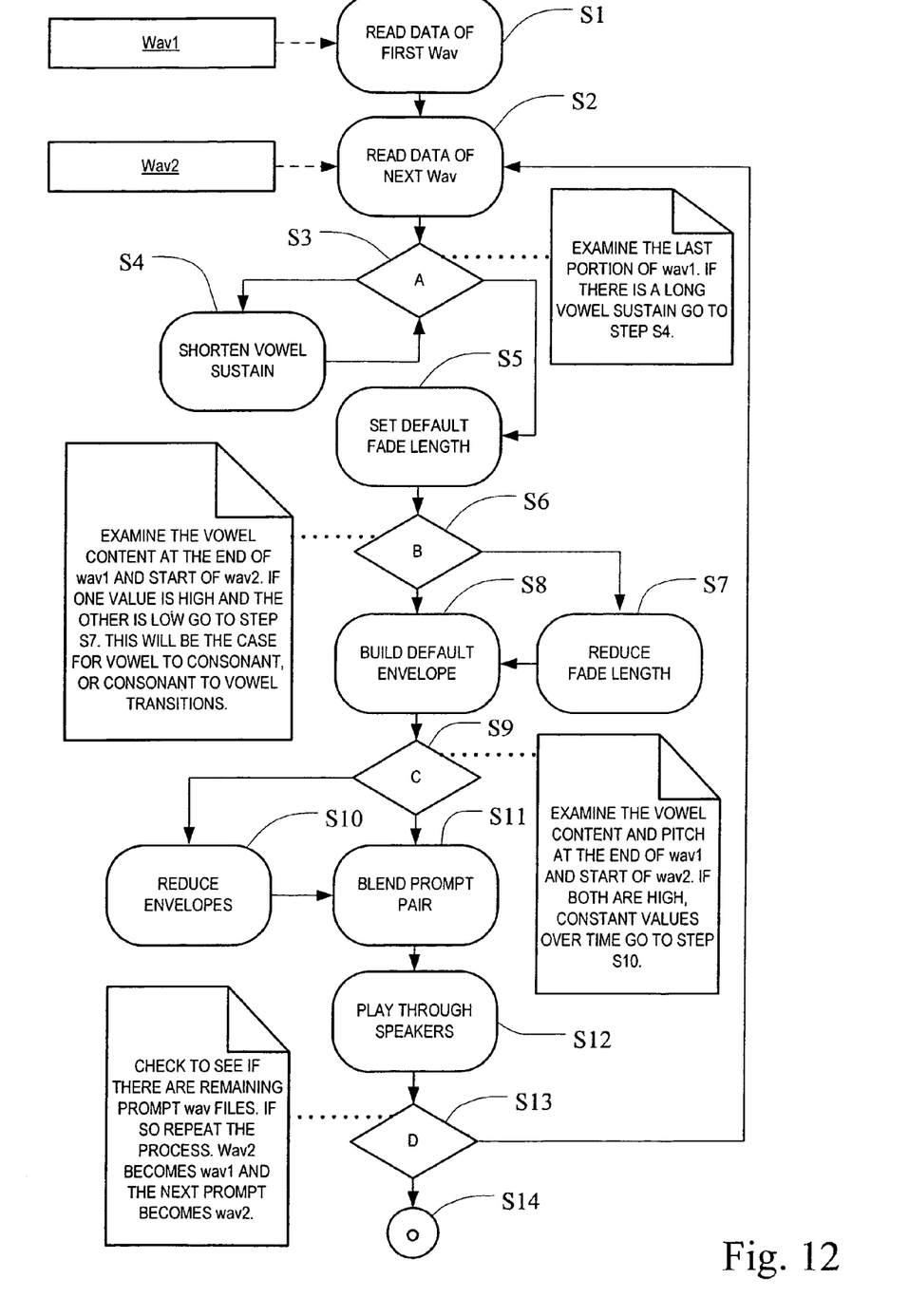
FIG. 12 shows a flow chart for creating dynamically cross faded messages according to the invention.

In addition to selecting the fade length and determining the shape of the cross fade envelopes, the sound segments themselves may be truncated based on their spectral characteristics to create shorter more natural sounding voice messages and prompts. FIG. 12 is a flow chart of a method for dynamically cross fading sound segments according to the invention. The method applies the techniques described above for dynamically cross fading pre-recorded sound segments to produce natural sounding voice prompts and messages. A message synthesis program or algorithm identifies at least two sound segments that must be combined to form a desired message or prompt. Typically the sound segments will be stored as digital wav files on a local storage device. The first step S1 is to read a leading sound segment. The leading sound segment is the sound segment that must be produced first in the sequence of sound segments to produce the desired voice message or prompt. The second S2 step is to read the following sound segment. The following sound segment is the sound segment that will be played immediately after the leading sound segment.

At step S3 the trailing portion of the first sound segment, i.e. the part that will lead into the second sound segment, is examined to determine whether it ends with a long sustained vowel sound. Examples of sound segments that end in long sustained vowel sounds include words such as "two" and "three" and the like. If the first sound segment does in fact end in a long sustained vowel, the sustained vowel is truncated by some predefined amount in step S4. For example, the sustained vowel at the end of the first segment may be shortened by a predefined percentage of its overall length. Once the sustained vowel has been shortened, it is again evaluated at S3. If it is still too long it is again truncated at step S4. Otherwise, if it is determined at step S3 that the first sound segment does not end in a long sustained vowel, either initially or after the leading sound segment has been truncated in step S4, the process moves directly to step S5 where a default fade length is established. The default fade length is derived from the characteristics of the second sound segment. According to an embodiment of the invention, the default fade length is calculated to be the length of time in which it takes the second sound segment to reach a predefined threshold amplitude. For example, the default fade length may be defined as the length of time required for the second sound segment to reach 82% or some other fraction of its full amplitude.

Next, at step S6, the vowel content at the end of the first sound segment and at the start of the second sound segment is examined. If either the end of the first sound segment or the beginning of the second sound segment has a low value for vowel content, and the other does not, meaning there will be either a vowel to consonant or consonant transition from the first sound segment to the second sound segment, then the fade length is reduced at step S7. However, if it is determined at step S6 that both the first sound segment ends with and the second sound segment begins with a vowel or both the first sound segment ends with and the second sound segment begins with a consonant, meaning either a vowel to vowel transition or a consonant to consonant transition, the fade length is left unchanged and the process proceeds directly to step S8 where the default cross fade amplitude envelopes are constructed. The cross amplitude fade envelopes must be made to fit within the cross fade time, be it the default cross fade time or as adjusted in step S7. Thus for example, if a linear fade-out cross fade amplitude envelope has been selected, and the default fade length is 3L.C., the fade-out cross fade amplitude envelope must be constructed such that the amplitude of the leading sound segment is attenuated at a constant rate so that the amplitude goes from its full unattenuated amplitude to zero amplitude within the 3MS cross fade time. A similar constraint applies to the fade-in cross fade amplitude envelope applied to the following sound segment.

At step S9 the vowel content at the end of the first sound segment and the beginning of the second sound segment is again examined. If both have high vowel content values, the default cross fade amplitude envelopes constructed at step S8 are modified at step S10. For example the shape of the envelope may be altered so that the amplitude of the sound segment is attenuated more or less aggressively over the course of the fade length. For example, for a first sound segment ending in "two" and a second sound segment beginning in "one," the vowel sound at the end of "two" and at the beginning of "one" blend naturally, the two sounds may be overlapped without completely fading the "two" and the "one" may be faded or beginning at a higher threshold. If there is no vowel-to-vowel sound pairing found at step S9 or after the cross-fade amplitude envelopes have been modified at step S10, the first and second sound segments are blended at step S11. This step comprise adding the overlapped portions of the first and second sound segments as modified by the cross fade amplitude envelopes. At step S12 a determination is made whether additional sound segments must be combined to complete the desired voice message or prompt. If additional sound segments are required, the process returns to step S2 where the next sound segment is read and the process repeats. The second sound segment having just been blended with the first sound segment now becomes the leading sound segment and the next sound segment becomes the following sound segment. If, after all of the sound segments are blended at step S11, there are no more sound segments to be combined, the entire voice message or prompt is played over a loudspeaker in step S13, and the process ends at S14.

Figure 13:
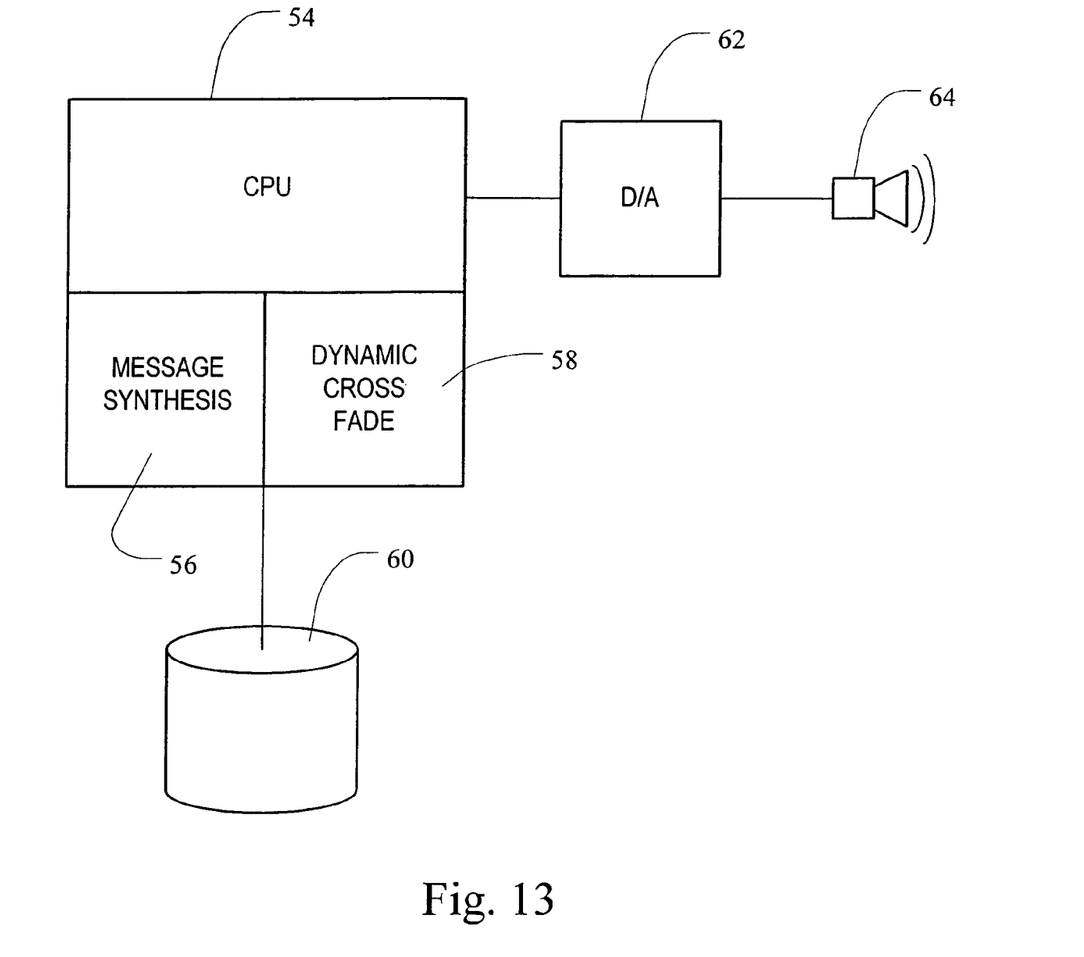
FIG. 13 shows a block diagram of a dynamic cross fading system according to the invention.

FIG. 13 shows a block diagram of a dynamic cross fade system for creating blended, natural sounding voice messages and prompts according to the invention. The system includes a processor 54 which executes a message synthesis program 56 which generates voice messages and prompts from a plurality of pre-recorded sound segments. A data storage device 60 is provided for storing the pre-recorded sound segments. The pre-recorded sound segments may be stored as digital wave files. The message synthesis program 56 identifies the various sound files that must be combined to create the messages and the processor 54 retrieves the file from the storage device 60. The CPU 54 further executes the processing necessary to implement the dynamic cross fading method 58 described in the flow chart of Fig. 12. The dynamic cross fading program reads the various sound segment files and analyzes their contents. Once the sound segments have been analyzed, the cross fade length determined, and cross fade amplitude envelopes constructed and applied to the sound segments, the sound segments are blended and the processor 54 outputs the message or prompt to a D/A converter 62. The D/A converter 62 converts the messages to an analog signal that is played out over a loudspeaker 64.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method of creating a voice communication from a plurality of pre-recorded sound segments, the method comprising:
    identifying first and second sound segments from among said plurality of pre-recorded sound segments which are to be sequentially combined within said voice communications;
    establishing a cross fading time based on one or more characteristics of the second sound segment;
    comparing a trailing portion of the first sound segment and a leading portion of the second sound segment to determine whether to reduce the established cross fading time;
    cross fading the first and second sound segments; and
    playing the cross faded first and second sound segments over a loudspeaker.

2. The method of claim 1 wherein the step of cross fading the first and second sound segments comprises overlapping in time the trailing portion of the first sound segment and the leading portion of the second sound segment.

3. The method of claim 2 wherein the step of comparing a trailing portion of the first sound segment and a leading portion of the second sound segment to determine whether to reduce the cross fading time comprises analyzing the first and second sound segments for a vowel to consonant or consonant to vowel transition.

4. The method of claim 2, wherein the step of cross fading the first and second sound segments further comprises applying a cross fade amplitude envelope to at least one of the trailing portion of the first sound segment and the leading portion of the second sound segment so that a portion of the sound segment to which a cross fade amplitude envelope is applied is attenuated according to a shape of the cross fade amplitude envelope.

5. The method of claim 4 wherein the step of cross fading the first and second sound segments further comprises examining one or more spectral characteristics of at least one of the trailing portion of the first sound segment and the leading portion of the second sound segment, and determining the shape of at least one cross fade amplitude envelope based on said spectral characteristics.

6. The method of claim 5 wherein examining one or more spectral characteristics of at least one of the first and second sound segments comprises determining vowel content of one of the trailing portion of the first sound segment and the leading portion of the second sound segment.

7. The method of claim 1 where the established cross fading time comprises a length of time in which it takes the second sound segment to reach a predetermined threshold amplitude.

8. A method of creating voice communications from a plurality of pre-recorded sound segments, the method comprising:
    identifying first and second sound segments which are to be sequentially combined within the voice communication;
    evaluating one or more spectral characteristics of a trailing portion of the first sound segment and determining whether to truncate a portion of the first sound segment;
    establishing a cross fade time during which the first sound segment and the second sound segment are overlapped;
    evaluating a characteristic of one of the first and the second sound segments and determining whether to adjust the cross fade time based on a result of the evaluated characteristic;
    creating cross fade amplitude envelopes for said first and second sound segments each cross fade amplitude envelope having a shape;
    applying the cross fade amplitude envelopes to the first and second sound segments such that the first and second sound segments are attenuated according to the shape of the cross fade amplitude envelopes;
    temporally overlapping portions of the first and second sound segments; and
    playing the overlapped portions of the first and the second sound segments through a loudspeaker.

9. The method of claim 8 wherein the characteristic examined is vowel content of a trailing portion of the first sound segment.

10. The method of claim 8 wherein the characteristic examined is vowel content of the leading portion of the second sound segment.

11. The method of claim 8 comprising step of evaluating a characteristic of one of the first and second sound segments, and adjusting the shape of one of the cross fade amplitude envelopes based on the characteristic evaluated.

12. The method of claim 11, wherein the characteristic evaluated is the vowel content of the trailing portion of the first sound segment and the leading portion of the second sound segment.

13. The method of claim 12 wherein, when vowel content of the trailing portion of the first sound segment and the leading portion of the second sound segment is low, indicating that both the first sound segment ends and the second sound segment begins with a hard consonant sound, the method further comprising, adjusting the shape of the cross fade amplitude envelopes so that the first sound segment is attenuated and the second sound segment reaches full amplitude at a faster rate.

14. The method of claim 8 where the shape of a cross fade amplitude is selected from one of: a sinusoidal shape, a linear shape, a logarithmic shape, and an exponential shape.

15. A system for creating voice communications from a plurality of pre-recorded sound segments, comprising:
a storage means for storing a plurality of sound segments;
a processor adapted to identify two or more sound segments to be combined to create a desired voice communication, analyze one or more spectral characteristics of the two or more sounds segments to determine whether to adjust an established cross time between the two or more sound segments, and cross fade said sound segments to provide a blended natural sounding voice communication; and
a speaker for playing said voice communication.

16. The system of claim 15 wherein said processor is further adapted to analyze said sound segments, and determine cross fade parameters based on said analysis.

17. The system of claim 15 wherein said sound segments comprise digital audio data files stored on the storage means.

18. The system of claim 17 further comprising a digital to analog converter for converting cross faded digital audio data files into an analog signal to be played over the speaker.

19. A method of creating voice communications from a plurality of pre-recorded sound segments, the method comprising:
identifying first and second sound segments which are to be sequentially combined within the voice communication;
creating cross fade amplitude envelopes for said first and second sound segments each cross fade amplitude envelope having a shape;
applying the cross fade amplitude envelopes to the first and second sound segments such that the first and second sound segments are attenuated according to the shape of the cross fade amplitude envelopes; and
temporally overlapping portions of the first and second sound segments;
evaluating a characteristic of one of the first and second sound segments, and adjusting the shape of one of the cross fade amplitude envelopes based on the characteristic evaluated;
wherein the characteristic evaluated is the vowel content of the trailing portion of the first sound segment and the leading portion of the second sound segment; and
wherein, when vowel content of the trailing portion of the first sound segment and the leading portion of the second sound segment is low, indicating that both the first sound segment ends and the second sound segment begins with a hard consonant sound, the method further comprising, adjusting the shape of the cross fade amplitude envelopes so that the first sound segment is attenuated and the second sound segment reaches full amplitude at a faster rate.

* * * * *

UNITED STATES PATENT AND TRADEMARK OFFICE
CERTIFICATE OF CORRECTION

PATENT NO.       : 7,571,104 B2
APPLICATION NO. : 11/139028
DATED            : August 4, 2009
INVENTOR(S)      : Escott et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 954 days.

Signed and Sealed this

Seventh Day of September, 2010

David J. Kappos
*Director of the United States Patent and Trademark Office*